United States Patent [19]

Hefner, Jr. et al.

[11] Patent Number: 5,541,323

[45] Date of Patent: Jul. 30, 1996

[54] MESOGEN-CONTAINING AROMATIC ANHYDRIDE COMPOUNDS

[75] Inventors: Robert E. Hefner, Jr.; Jimmy D. Earls, both of Lake Jackson, Tex.

[73] Assignee: The Dow Chemical Company, Midland, Mich.

[21] Appl. No.: 374,285

[22] Filed: Jan. 18, 1995

Related U.S. Application Data

[62] Division of Ser. No. 196,670, Feb. 15, 1994, Pat. No. 5,412,057.

[51] Int. Cl.⁶ .................. C07D 407/12; C07D 405/14; C07D 411/14; C07D 413/14
[52] U.S. Cl. .................. 544/96; 544/376; 544/333; 544/182; 544/179; 546/153; 546/155; 546/168; 546/170; 546/173; 548/218; 548/151; 548/304.4; 549/242; 549/370; 549/22; 549/14; 549/30; 549/60
[58] Field of Search .................. 549/242, 370, 549/22, 14; 548/218, 151; 544/179

[56] References Cited

U.S. PATENT DOCUMENTS

| 3,182,073 | 5/1965 | Loncrini | 260/346.3 |
|---|---|---|---|
| 5,218,062 | 6/1993 | Earls et al. | 525/526 |
| 5,227,452 | 7/1993 | Earls et al. | 528/96 |
| 5,266,660 | 11/1993 | Hefner, Jr. et al. | 525/481 |
| 5,266,661 | 11/1993 | Earls et al. | 525/481 |
| 5,270,404 | 12/1993 | Earls et al. | 525/481 |
| 5,270,405 | 12/1993 | Earls et al. | 525/481 |
| 5,270,406 | 12/1993 | Earls et al. | 525/481 |

FOREIGN PATENT DOCUMENTS

4021328A1 1/1992 Germany.

OTHER PUBLICATIONS

"4-Esters of Trimellitic Anhydride", by I. Puskas and E. Fields in *Ind Eng. Chem. Prod. Res. Develop.*, vol. 9, No. 3, pp. 403–407, 1970 **.

*Primary Examiner*—Mukund J. Shah
*Assistant Examiner*—King L. Wong

[57] ABSTRACT

Anhydride compounds which contain at least one rodlike mesogenic moiety and at least two anhydride groups per molecule, wherein each of said aromatic anhydride groups is linked to the mesogen via an ester linkage are prepared. These anhydride compounds are useful in curing epoxy resins to provide the cured products with one or more improved properties.

2 Claims, No Drawings

MESOGEN-CONTAINING AROMATIC ANHYDRIDE COMPOUNDS

CROSS-REFERENCE TO RELATED APPLICATION

This is a divisional of application Ser. No. 08/196,670 filed Feb. 15, 1994, now U.S. Pat. No. 5,412,057.

FIELD OF THE INVENTION

The present invention concerns aromatic anhydrides which contain rodlike mesogenic moieties, curable compositions containing them and cured products.

BACKGROUND OF THE INVENTION

Aromatic anhydride compounds have well established utility in the preparation of a wide variety of both thermoplastic and thermoset compositions. For example, polyimides are prepared via the condensation reaction of aromatic dianhydrides of tetracarboxylic acids with diamines. Typical of the dianhydride reactants employed are benzophenone tetracarboxylic dianhydride, pyromellitic dianhydride, 1,2,3,4-butanetetracarboxylic dianhydride, methanetetraacetic dianhydride, cyclooctadienetetracarboxylic dianhydride and pyrazinetetracarboxylic dianhydride.

Additionally, aromatic anhydride compounds have found utility as curing agents for epoxy resins. Products have heretofore been prepared by curing diglycidyl ethers which contain a mesogen selected from the group consisting of the direct bond, $-CH_2-CH_2-$, $-CH(CH_3)-CH_2-$, $-CH(CH_3)-CH(CH_3)-$, $-CH=CH-$, $-N=N-$, $-CH=C(CH_3)-$, $-CH=N-$, $-O-CH_2-$, and $-S-CH_2-$ linkage between a pair of substituted or unsubstituted benzene rings with non-mesogenic anhydride curing agents which are disclosed by German Patent No. 4021328. A single anhydride curing agent, biphenyltetracarboxylic dianhydride, disclosed therein contains the biphenyl group, a mesogenic moiety, however the direct tetrasubstitution on the pail of aromatic rings of the biphenyl group by the pair of anhydride groups precludes liquid crystallinity. This is because anhydride ring opening, as occurs during the curing reaction between the epoxide and anhydride group provides a pail of linkages between each aromatic ring of the biphenyl and the epoxide curing structure which are ortho to each other. It is well established that for liquid crystallinity to occur, pars substitution must predominate.

It would be desirable to have available curing agents which could provide improved properties resulting from curing epoxy resins which do not contain mesogenic moieties and ale readily available. It would also be desirable to have available epoxy resin curing agents which contain mesogenic moieties for use in curing epoxy resins which also contain mesogenic moieties. The simultaneous presence of mesogenic moieties in the epoxy resin as well as the curing agent allows for a greater concentration of said moieties in the cured products thereof and thus a higher susceptibility to induced orientation and the enhanced mechanical properties resulting therefrom. It would also be desireable to have available mesogenic dianhydride curing agents for epoxy resins in which the anhydride groups are not substituted directly on the aromatic rings of the mesogen, but rather, are coupled through the mesogen via some type of flexible spacer or linkage via para substitution to the mesogenic moiety.

The present invention provides a heretofore unknown class of aromatic anhydride compounds which contain rodlike mesogenic moieties and thus can be used to provide cured epoxy resin products possessing an improvement in one or more physical and/or mechanical properties. Said aromatic anhydride compounds are para substituted via a spacer group between the anhydride groups and the mesogen and thus provide the desired liquid crystalline character.

SUMMARY OF THE INVENTION

One aspect of the present invention pertains to aromatic anhydrides which contain at least one rodlike mesogenic moiety and at least two anhydride groups per molecule, wherein each of said aromatic anhydride groups is linked to the mesogen via an ester linkage.

Another aspect of the present invention pertains to a curable composition comprising a mixture containing (A) at least one resin having an average of more than one vicinal epoxy or vicinal thiirane group per molecule; and (B) at least one aromatic dianhydride which contains at least one rodlike mesogenic moiety and at least two anhydride groups per molecule, wherein each of said aromatic anhydride groups is linked to the mesogen via an ester linkage; and (C) optionally, at least one epoxy resin curing agent which is different from component (B) and/or curing catalyst; and wherein components (B) and (C) combined are present in quantities sufficient to cure component (A).

Another aspect of the present invention pertains to a curable composition comprising a mixture containing (A) at least one resin having an average of more than one vicinal epoxy or vicinal thiirane group per molecule; and (B) the reaction product of
  (1) at least one aromatic anhydride which contains at least one rodlike mesogenic moiety and at least two anhydride groups per molecule, wherein each of said aromatic anhydride groups is linked to the mesogen via an ester linkage, with
  (2) at least one compound which is reactive with an anhydride group, said reaction product being reactive with an epoxy or thiirane group; and (C) optionally, at least one epoxy resin curing agent which is different from component (B); and (D) optionally, at least one curing catalyst; and wherein components (B) and (C) combined are present in quantities sufficient to cure component (A).

A still further aspect of the present invention pertains to the product resulting from curing said curable compositions wherein said curable compositions have been subjected to either (a) the application of an electric field, (b) the application of a magnetic field, (c) drawing or shear forces, or (d) any combination thereof either (i) before curing or processing, (ii) during curing or processing, or (c) both before and during curing or processing.

A further aspect of the present invention pertains to the product resulting from curing the aforementioned curable compositions.

The compositions and products of the present invention can consist of, consist essentially of or comprise the enumerated components.

DETAILED DESCRIPTION OF THE INVENTION

DEFINITIONS

The term "hydrocarbyl" as employed herein means any aliphatic, cycloaliphatic, aromatic, aryl substituted aliphatic or cycloaliphatic or aliphatic or cycloaliphatic substituted aromatic groups. The aliphatic or cycloaliphatic groups can be saturated or unsaturated. Likewise, the term "hydrocarbyloxy" means a hydrocarbyl group having an oxygen linkage between it and the carbon atom to which it is attached.

The term "mesogenic" or "mesogen" as is used herein designates compounds containing one or more rigid rodlike structural units which have been found to favor the formation of liquid crystal phases in the case of low molar mass substances. The term "mesogenic moiety" as is used herein designates the rigid rodlike structural unit contained within the mesogenic compound. Thus the mesogen or mesogenic moiety is that structure responsible for molecular ordering. The term mesogenic is further defined by R. A. Weiss (ed.) and C. K. Ober (ed.) in *Liquid-Crystalline Polymers*, ACS Symposium Series 435 (1989) on pages 1–2: "The rigid unit responsible for the liquid crystalline behavior is referred to as the mesogen," and "Liquid crystalline order is a consequence solely of molecular shape anisotropy, such as found in rigid rodshaped molecules . . ." and "Liquid crystal is a term that is now commonly used to describe materials that exhibit partially ordered fluid phases that are intermediate between the three dimensionally ordered crystalline state and the disordered or isotropic fluid state. Phases with positional and/or orientational long-range order in one or two dimensions are termed mesophases. As a consequence of the molecular order, liquid crystal phases are anisotropic, i.e., their properties are a function of direction." Further definition of the term mesogenic may be found in *Polymeric Liquid Crystals*, Alexandre Blumstein (ed.), (1983) on pages 2–3: "Compounds forming small molecule thermotropic liquid crystals usually have the following molecular structural features:—high length:breadth (axial) ratio—rigid units such as 1,4-phenylene, 1,4-bicyclooctyl, 1,4-cyclohexyl, etc.,—rigid central linkages between rings such as —COO—, —CH=CH—, —N=NO—, —N=N—, etc.—anisotropic molecular polarization".

The term "inertly substituted" means that the substituent group(s) do not enter into any significant reaction with the other reactant(s) or product(s) of the reaction at the conditions employed.

The terms "curable" and "thermosettable" are used synonamously throughout and mean that the composition is capable of being subjected to conditions which will render the composition to a cured or thermoset state or condition.

The terms "cured" and "thermoset" are used synonamously throughout. The term "thermoset" is defined by L. R. Whittington in *Whittinaton's Dictionary of Plastics* (1968) on page 239: "Resin or plastics compounds which in their final state as finished articles are substantially infusible and insoluble. Thermosetting resins are often liquid at some stage in their manufacture or processing, which are cured by heat, catalysis, or some other chemical means. After being fully cured, thermosets cannot be resoftened by heat. Some plastics which are normally thermoplastic can be made thermosetting by means of crosslinking with other materials."

The term "curing" means subjecting the composition to be cured to conditions which effect curing i.e., to conditions which cause the composition to become "cured" or "thermoset".

The term "B-staging" as employed herein designates that partial curing (thermosetting) of a curable composition has occurred. The term "B-stage" is defined in *The Epoxy Resin Formulators Training Manual*, by The Society of the Plastics Industry, Inc. (1985) on pages 270–271:

"An intermediate stage in the reaction of certain thermosetting resins in which the material softens when heated and swells when in contact with certain liquids, but may not entirely fuse or dissolve.".

NUMERICAL VALUES RECITED HEREIN

Any numerical values recited herein include all values from the lower value to the upper value in increments of one unit provided that there is a separation of at least 2 units between any lower value and any higher value. As an example, if it is stated that the amount of a component is, for example, from 1 to 90, preferably 20 to 80, more preferably from 30 to 70, it is intended that values such as 15–85, 22–68, 43–51, 30–32 etc. are expressly enumerated in this specification. Usually, for values which are less than one, one unit is considered to be 0.1; therefore, the minimum separation between any lower value and any higher value is 0.2. However, for the amounts of cure retarding catalysts, one unit is considered to be 0.00001, 0.0001, 0.001, 0.01 or 0.1 as appropriate. These are only examples of what is specifically intended and all possible combinations of numerical values betwen the lowest value and the highest value enumerated are to be considered to be expressly stated in this application in a similar manner.

PREPARATION OF ANHYDRIDES CONTAINING RODLIKE MESOGENIC MOIETIES

The anhydride compositions of the present invention are prepared by reacting an aromatic acid halide anhydride which, is an aromatic compound containing an acid chloride or bromide,

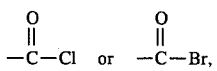

group and at least one anhydride

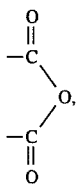

group per molecule with a compound containing at least one rodlike mesogenic moiety per molecule and at least two hydroxyl groups per molecule. The reaction can be conducted at atmospheric, superatmospheric or subatmospheric pressures and at a temperature of from about −20° C. to about 75° C., preferably from about −10° C. to about 50° C., more preferably from about −5° C. to about 25° C., for a time sufficient to complete the reaction, usually from about one hour to about 96 hours, preferably from about 4 hours to about 72 hours, more preferably from about 8 hours to about 48 hours.

At temperatures below about −20° C., the reaction of the aromatic compound containing an acid chloride or bromide group and at least one anhydride group per molecule with a compound containing at least one rodlike mesogenic moiety per molecule and at least two hydroxyl groups per molecule may proceed at a rate slower than desired and additionally may lead to lower than desired solubility of the reactants or reaction intermediates in solvents typically employed for the reaction. At temperatures above about 75° C., extensive coproducts may form, including polymerization products of the anhydride groups and hydroxyl groups in the aromatic compound containing an acid chloride or bromide group and at least one anhydride group per molecule and a compound containing at least one rodlike mesogenic moiety per molecule and at least two hydroxyl groups per molecule, respectively.

The reactants are employed in quantities which provide an equivalent ratio of acid chloride or acid bromide groups to hydroxyl groups of from about 0.95:1 to about 1.1:1, preferably from about 0.99:1 to about 1.05:1, more preferably from about 1:1 to about 1.01:1.

At equivalent ratios below about 0.95:1, substantial unreacted hydroxyl groups remain and may lead to instability and coproduct formation in the product due to a propensity to react with anhydride groups. At equivalent ratios above about 1.1:1, excessive amounts of unreacted aromatic acid halide anhydride remain in the product and need to be removed for many applications of said product.

If desired, the reaction can be conducted in the presence of one or more solvents such as, for example aliphatic, cycloaliphatic and aromatic hydrocarbons, chlorinated aliphatic hydrocarbons, aliphatic and cycloaliphatic ethers and diethers, ketones, sulfoxides, sulfones, or any combination thereof and the like. Particularly suitable such solvents include, for example, hexane, toluene, xylene, acetone, methylethyl ketone, methylisobutyl ketone, diethylene glycol methyl ether, dipropylene glycol methyl ether, ethylene glycol phenyl ether, dimethylsulfoxide, tetrahydrofuran, 1,4-dioxane, chloroform, ethylene dichloride, sulfolane, perchloroethylene, or any combination thereof and the like.

When solvents are employed, they are usually employed in amounts of from about 5 to about 95, preferably from about 15 to about 85, more preferably from about 25 to about 75, percent by weight based upon the combined weight of the aromatic acid halide anhydride and the compound containing at least one rodlike mesogenic moiety and at least two hydroxyl groups per molecule.

Also, if desired, one or more catalysts such as, for example N,N-dialkylaminopyridines, pyridine, trialkylamines, N-alkylmorpholines, or any combination thereof and the like can be employed. Particularly suitable such catalysts include, for example, 4-(N,N-dimethylamino)pyridine, triethylamine, N-methylmorpholine or any combination thereof and the like.

When catalysts are employed, they are usually employed in amounts of from about 0.05 to about 5, preferably from about 0.1 to about 2.5, more preferably from about 0.5 to about 1.5, percent by weight based upon the combined weight of the aromatic acid halide anhydride and compound containing at least two hydroxyl groups per molecule.

General methodology for the preparation of 4-esters of trimellitic anhydride acid chloride is given by I. Puskas and E. K. Fields, *Ind. Eng. Chem. Prod, Res. Develop*, vol. 9, no. 3, 403–407 (1970), which is incorporated herein by reference in its entirety.

AROMATIC ACID HALIDE ANHYDRIDES

Suitable aromatic acid halide anhydrides which can be employed herein to prepare the aromatic anhydride compounds of the present invention include, for example, those represented by the following general Formula I

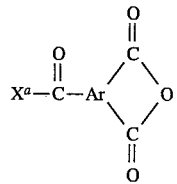

Formula I wherein Ar is a mono- or multi-ring aromatic group or inertly substituted mono- or multi-ring aromatic group and $X^a$ is chlorine or bromine. Particularly suitable inert substituents include, for example, hydrocarbyl or hydrocarbyloxy groups containing from 1 to about 20, preferably from 1 to about 8, more preferably from 1 to about 4 carbon atoms, $-NO_2$, $-CN$, $-OCH_3$, $-Cl$, $-F$, $-Br$, $-CO-R^2$, where $R^2$ is hydrogen or a hydrocarbyl group having from one to about 6, preferably from one to about 2, carbon atoms and is more preferably hydrogen or a methyl group.

Particularly suitable aromatic acid halide anhydrides which can be employed herein include, for example, trimellitic anhydride acid chloride, trimellitic anhydride acid bromide,

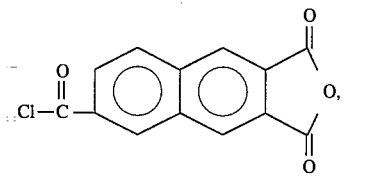

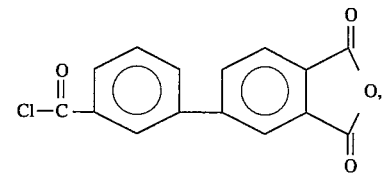

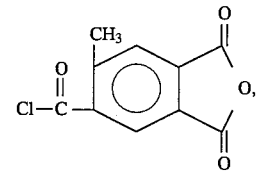

or any combination thereof and the like.

COMPOUNDS CONTAINING TWO HYDROXYL GROUPS PER MOLECULE

Suitable such compounds which can be employed herein to prepare the aromatic anhydride compounds containing rodlike mesogenic moieties of the present invention include, for example, those represented by the following general Formula II $$HO-[-Z-O-]_q-M-[-O-Z-]_q-OH \qquad \text{Formula II}$$

wherein M is a divalent rodlike mesogenic moiety represented by the following Formula III.

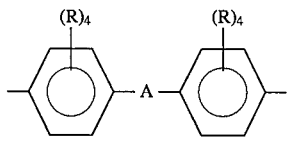

Formula III wherein each A is independently a single bond, $-CR^2=CR^2-$, $-C\equiv C-$, $-N=N-$, $-CR^2=N-$, —N=CR²—, —O—CO—, —CO—O—, —S—CO—, —CO—S—, —NR²—CO—, —CO—NR²—, —CR²=N—N=CR²—, —CO—CR²=CR²—, —CR²=CR²—CO—, —CO—O—N=CR²—, —CR²=N—O—OC—, —CO—O—N=CR²—, —CO—NR²—NR²—OC—, —CR²=CR²—O—OC—, —CO—O—CR²=CR²—, —O—CO—CR²=CR²—, —CR²=CR²—CO—O—(CHR²)$_n$—O—CO—CR²=CR²—, CR²=CR²—CO—O—(CHR²)$_{n'}$—, —(CHR²)$_{n'}$—CO—O—CR²=CR²—, —CR²=CR²O—CO—(CHR²)$_{n'}$—, —CH₂—CH₂—CO—O—, —O—OC—CH₂—CH₂—, —C≡C—C≡C—, —CR²=CR²—CR²=CR²—, —CR²=CR²—C≡C—, —C≡C—CR²=CR²—, —CR²=CR²—CH₂—O—OC—, —CO—O—CH₂—CR²=CR²—, —O—CO—C=C—CO—O—, —O—CO—CR²=CR²—CO—O—, —O—CO—CH₂—CH₂—CO—O—, —S—CO—CR²=CR²—CO—S—, —CO—CH₂—NH—CO—, —CO—NH—CH₂—CO—, —NH—C(—CH₃)=CH—CO—, —CO—CH=C(—CH₃)—NH—, —CR²=C(—Cl)—, —C(—Cl)=CR²—, —CR²=C(—CN)—, —C(—CN)=CR²—, —N=C(—CN)—, —C(—CN)=N—, —CR²=C(—CN)—CO—O—, —O—CO—C(—CN)=CR²—, $-N\overset{\overset{O}{\uparrow}}{=}N-$, $-N\overset{\overset{O}{\uparrow}}{=}CR^2-$, $-CR^3\overset{\overset{O}{\uparrow}}{=}N-$, $-NH-CO-CH\overset{\overset{O}{\uparrow}}{=}N-$, $-N\overset{\overset{O}{\uparrow}}{=}CH-CO-NH-$,

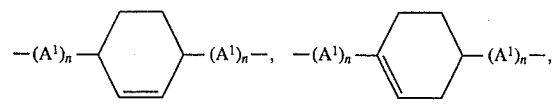

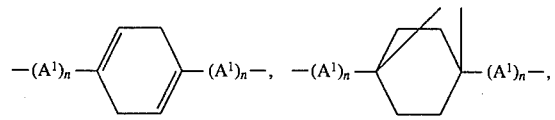

-continued

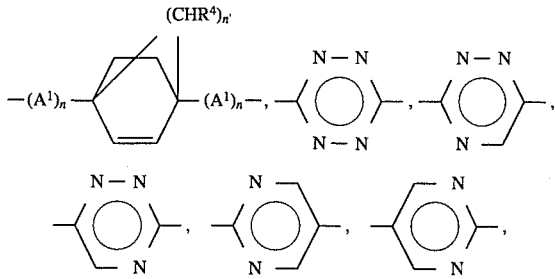

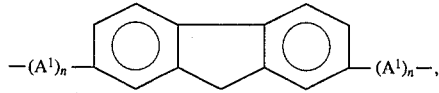

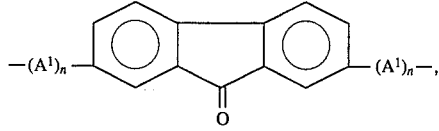

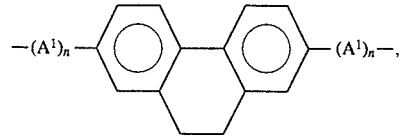

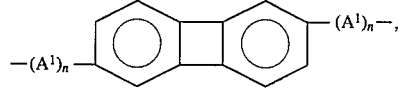

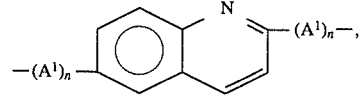

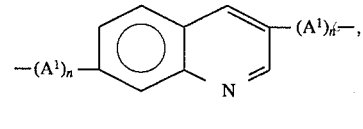

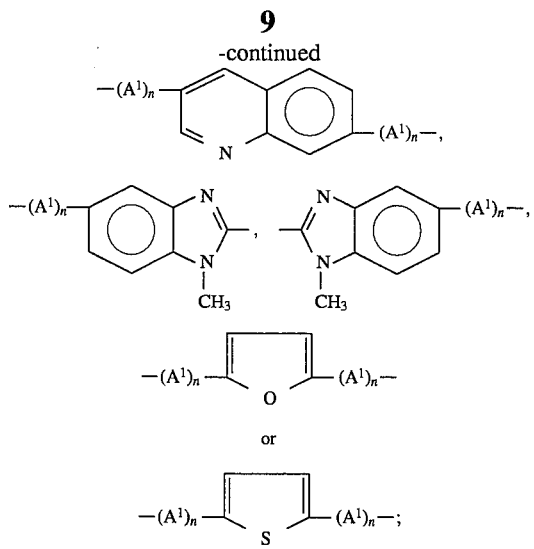

each $A^1$ is independently a —CO—, —O—CO—, —CO—O—, —CO—S—, —S—CO—, —CO—NR$^2$— or —NR$^2$—CO—group; each R is independently hydrogen or a hydrocarbyl or hydrocarbyloxy group having from one to about 10, preferably one to about 4, carbon atoms, a halogen atom, preferably chlorine, bromine or fluorine, a nitro group, a nitrile group or a —CO—R$^2$ group; each $R^1$ is independently hydrogen or a hydrocarbyl group having from one to about 10, preferably one to about 4, carbon atoms, a halogen atom, preferably chlorine, bromine or,fluorine, or a nitro group; each $R^2$ is independently hydrogen or a hydrocarbyl group having from one to about 6, preferably from one to about 4, more preferably from one to about 2, carbon atoms, and is most preferably hydrogen or a methyl group; each $R^4$ is independently hydrogen or a hydrocarbyl group having from one to about 3 carbon atoms; n has a value of zero or 1; Z is a divalent aliphatic, cycloaliphatic or polycycloaliphatic group; q has a value of zero to about 10, preferably zero to about 5, most preferably zero to about 2 and n' has a value of 1 or 2.

AROMATIC ANHYDRIDE COMPOUNDS WHICH CONTAIN RODLIKE MESOGENIC MOIETIES

The aromatic anhydride compounds of the present invention can be represented by the following general Formula IV

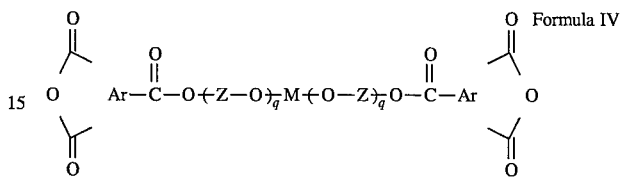

wherein Ar, Z, M and q are as previously defined, For the aromatic anhydride compounds of the present invention which contain at least one rodlike mesogenic moiety and at least two anhydride moieties per molecule, wherein each of said aromatic anhydride groups is linked to the mesogen via an ester linkage, q has a value of zero. For the aromatic anhydride compounds of the present invention which contain at least one rodlike mesogenic moiety and at least two anhydride moieties per molecule, wherein each of said aromatic anhydride groups is linked to the mesogen via a flexible spacer containing ester linkage, q has a value of one to about 10.

Representative of the aromatic anhydride compounds of the present invention which contain at least one rodlike mesogenic moiety and at least two anhydride moieties per molecule, wherein each of said aromatic anhydride groups is linked to the mesogen via an ester linkage include for example, those compounds, represented by the following formulas

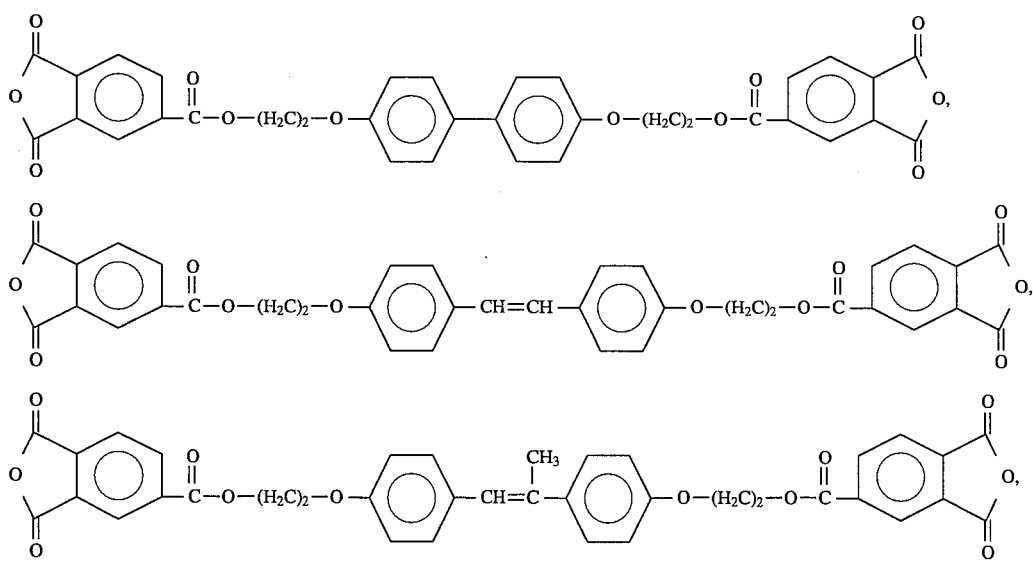

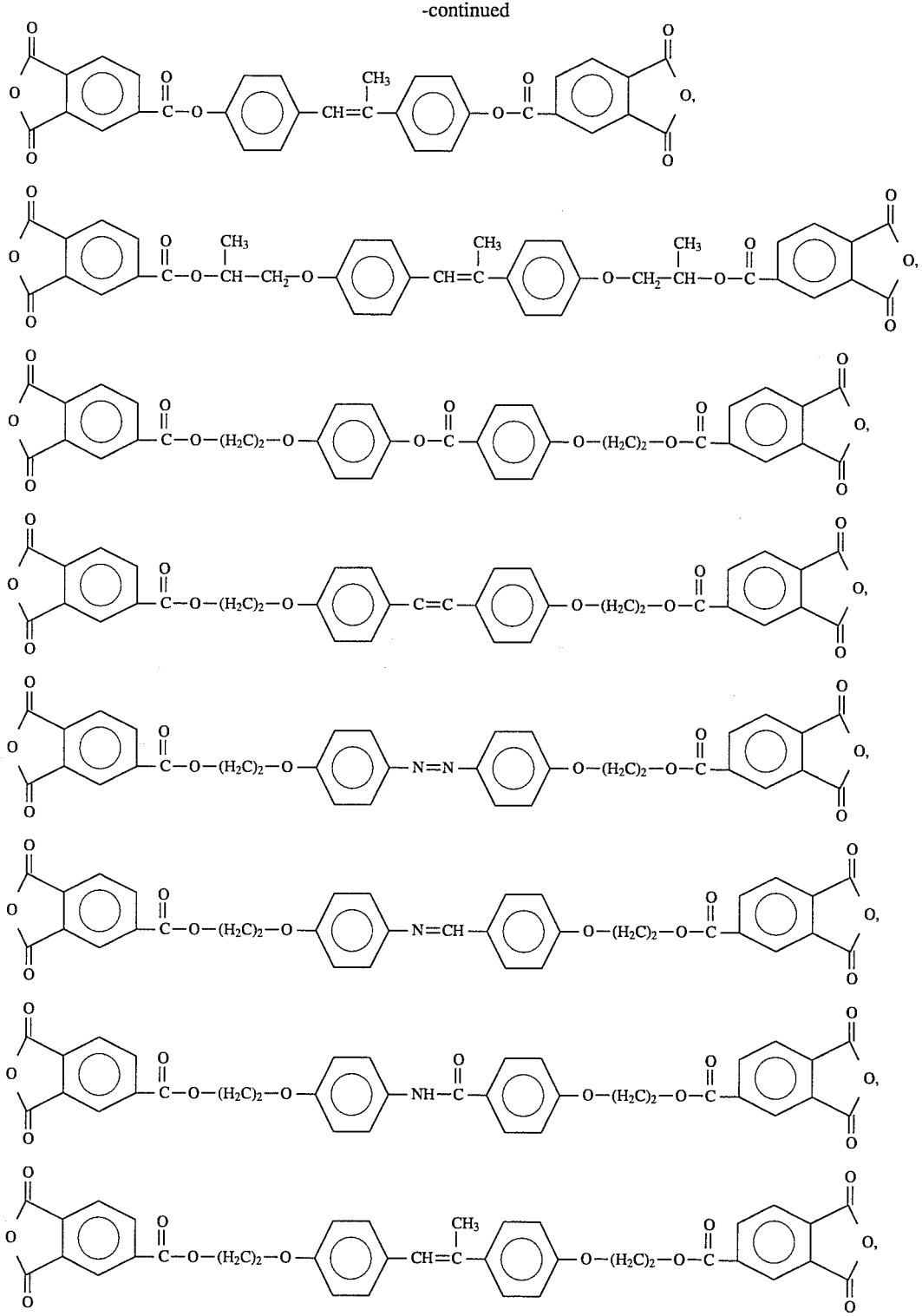

REACTION PRODUCTS OF AROMATIC ANHYDRIDE COMPOUNDS CONTAINING RODLIKE MESOGENIC MOIETIES

Reaction products of at least one aromatic anhydride which contains at least one rodlike mesogenic moiety and at least two anhydride groups per molecule, wherein each of said aromatic anhydride groups is linked to the mesogen via an ester linkage, with at least one compound which is reactive with an anhydride group to give a product which is reactive with an epoxide or thiirane group are useful as curing agents for epoxy or thiirane resins. The compound which is reactive with an anhydride group can include most any compound which is reactive with an anhydride group and provides a reaction product which is reactive with an epoxide or thiirane group. Suitable such compounds include water, ammonia, alcohols and diols, phenols and diphenols, primary diamines and polyamines, secondary diamines and polyamines, amidoamines, aminocarboxylic acids, sulfanilamides, combinations thereof and the like. Reaction of the anhydride group with stoichiometric or stoichiometric excess water provides the dicarboxylic acid. Thus, reaction of an aromatic dianhydride which contains at least one rodlike mesogenic moiety with water provides the corresponding aromatic tetracarboxylic acid which contains at least one rodlike mesogenic moiety. Less than stoichiometric water may be employed to provide a mixture of anhydride and carboxylic acid groups. Reaction of the anhydride group with stoichiometric or stoichiometric excess ammonia provides the primary amidocarboxylic acid which may further react to give the cyclic imide. Thus, reaction of an aromatic dianhydride which contains at least one rodlike mesogenic moiety with ammonia can be performed to provide the corresponding aromatic cyclic diimide which contains at least one rodlike mesogenic moiety. Reaction of the anhydride group with diamines and polyamines provides a variety of products depending upon the reaction stoichiometry employed. Thus, reaction of an aromatic dianhydride which contains at least one rodlike mesogenic moiety with less than stoichiometric diamine can be performed to provide oligomeric or polymeric products terminated with anhydride groups. These oligomeric or polymeric products may contain amidocarboxylic acid groups, cyclic imide groups or mixtures of such groups. Similarly, reaction of an aromatic dianhydride which contains at least one rodlike mesogenic moiety with greater than stoichiometric diamine can be performed to provide products terminated with aminoamidocarboxylic acid groups, amino cyclic imide groups or mixtures thereof plus unreacted diamine.

EPOXY AND THIIRANE RESINS

The epoxy and thiirane resins which can be employed to prepare the curable compositions of the present invention include essentially any epoxy-containing or thiirane-containing compound which contains an average of more than one vicinal epoxide group or vicinal thiirane group per molecule. The epoxide or thiirane groups can be attached to any oxygen, sulfur or nitrogen atom or the single bonded oxygen atom attached to the carbon atom of a —CO—O— group in which said oxygen, sulfur or nitrogen atom or the carbon atom of the —CO—O— group is attached to an aliphatic, cycloaliphatic, polycycloaliphatic or aromatic hydrocarbon group which hydrocarbon group can be substituted with any inert substituent including, but not limited to, halogen atoms, preferably fluorine, bromine or chlorine, or nitro groups, or such groups can be attached to the terminal carbon atoms of a compound containing an average of more than one —(O—CHR$^a$—CHR$^a$)$_t$— group where each R$^a$ is independently hydrogen or an alkyl or haloalkyl group, containing from one to about 2 carbon atoms, with the proviso that only one R$^a$ group can be a haloalkyl group, and t has a value from one to about 100, preferably from one to about 20, more preferably from one to about 10, most preferably from one to about 5.

Suitable such epoxy resins which can be employed to prepare the curable compositions of the present invention include, for example, the glycidyl ethers or glycidyl amines represented by the following Formulas V, VI, VII, VIII, IX, X, XI, XII, XII, XIII or XIV. Formula V

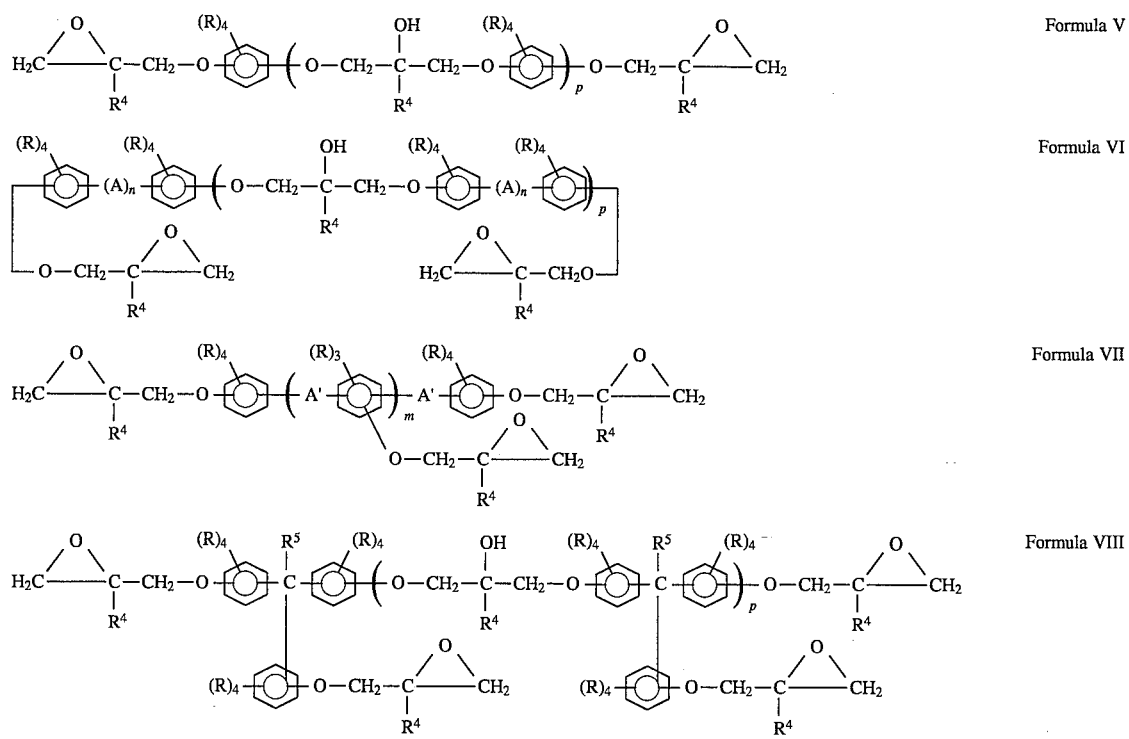

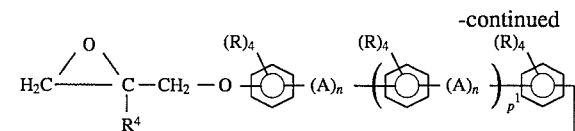 Formula IX

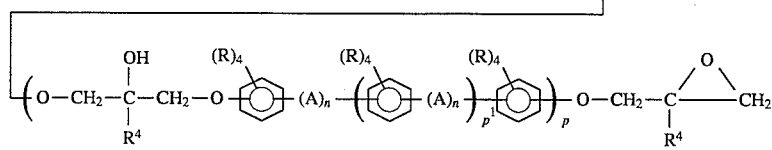

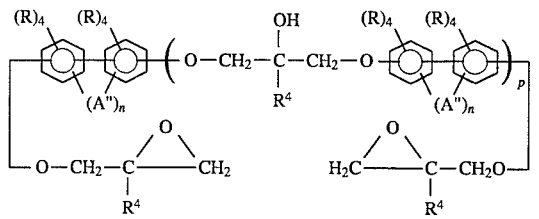 Formula X

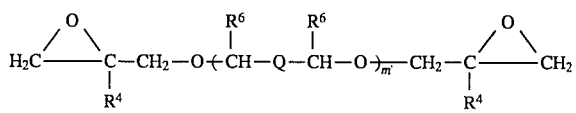 Formula XI

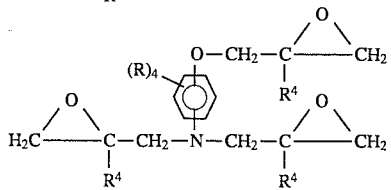 Formula XII

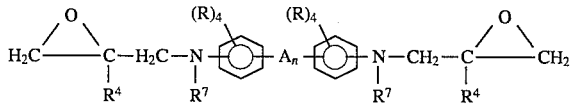 Formula XIII

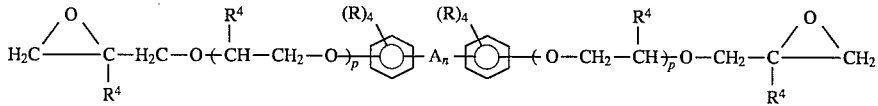 Formula XIV wherein A, R, $R^2$, $R^4$, and n are as hereinbefore defined and A can additionally include a divalent hydrocarbyl gorup having from one to carbon atoms, —O—, —CO—, —SO—, —$SO_2$—, —S—, or —S—S—; each A' is independently a divalent hydrocarbyl group having from one to about 10, preferably from 1 to about 6, more preferably from one to about 2, carbon atoms; A" is a divalent hydrocarbyl group having from one to about 6, preferably from one to about 4, more preferably from one to about 2, carbon atoms; each $A^1$ is independently a —CO—, —O—CO—, —CO—O—, —CO—S—, —S—CO—, —CO—$NR^2$— or —$NR^2$—CO—; each $R^5$ is independently hydrogen, a hydrocarbyl group having from one to about 10, preferably from one to about 6, more preferably from one to about 3, carbon atoms or a halogen atom, preferably chlorine or bromine; each $R^6$ is independently hydrogen or a hydrocarbyl or halohydrocarbyl group having from one to about 6, preferably from 1 to about 4, more preferably from one to about 2 carbon atoms; Q is a direct bond, —$CH_2$—S—$CH_2$—, —$(CH_2)_{n''}$—, or

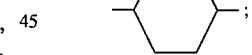

each $R^7$ is independently a hydrocarbyl group having from 1 to about 10, preferably from 1 to about 6, more preferably from 1 to about 2, carbon atoms or a

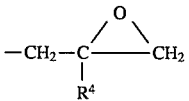

group; m has a value from about 0.001 to about 6, preferably from about 0.01 to about 3; m' has a value from one to about 10, preferably from one to about 4; n' has a value of one or two, n" has an average value of from about one to about 10; p has a value from zero to about 30, preferably from zero to about 5 and $p^1$ has a value of from one to about 30, preferably from one to about 3. The aromatic rings in Formulas V, VI, VII, VIII, IX, X, XII, XIII and XIV can also contain one or more heteroatoms selected from N, O, and S. The term "hydrocarbyl", when applied to the A" group of Formula X, can also include one or more heteroatoms selected from N, O and S. Thus, A" can be, for example, the —CO— or —CH$_2$—O—CH$_2$—group.

Mesogenic epoxy resins include those represented by Formulas VI, IX, X, XIII and XIV wherein each A is independently selected from the aforementioned listing, but with the proviso that A may not be a divalent hydrocarbyl group having from one to 20 carbon atoms, —O—, —CO—, —SO—, —SO$_2$—, —S—, —S—S— and with the proviso that at least 80 percent of the molecules are para substituted by the bridging groups (—A—) in Formulas VI, IX, XIII, XIV and by the direct bond in Formula X, the substituent containing the glycidyl,

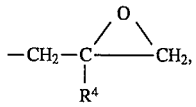

group(s), and the substituent containing the secondary hydroxyalkylidene, —CH$_2$—C(OH)(R$^4$)—CH$_2$—, group(s) which are present when p in Formulas V, VI, VIII, IX, and X has a value greater than zero.

Representative epoxy resins include, for example, the diglycidyl ethers of: resorcinol, hydroquinone, 4,4'-isopropylidenediphenol (bisphenol A), 4,4'-dihydroxydiphenylmethane (bisphenol F), 4,4'-dihydroxybenzophenone, 3,3',5,5'-tetrabromo-4,4'-isopropylidenediphenol, 4,4'-thiodiphenol, 4,4'-sulfonyldiphenol, 4,4'-dihydroxydiphenyl oxide, 1,1-bis(4-hydroxyphenyl)-1-phenylethane, 3,3'5,5'-tetrachloro-4,4'-isopropylidenediphenol A, 3,3'-dimethoxy-4,4'-isopropylidenediphenol, 4,4'-dihydroxy-alpha-methylstilbene, 4,4'-(2-hydroxyethyloxy)-alpha-methylstilbene, 4,4'-dihydroxybenzanilide, 4,4'-dihydroxyazoxybenzene, 4,4'-dihydroxybiphenyl, 4,4'-dihydroxydiphenylazomethine, 4,4'-dihydroxydiphenylacetylene, 4,4'-dihydroxystilbene, 4,4'-dihydroxy-alpha-cyanostilbene, 4,4'-dihydroxyazobenzene, 4,4'-dihydroxyazoxybenzene, 4,4'dihydroxychalcone, 4-hydroxyphenyl-4-hydroxybenzoate; dipropylene glycol, poly(propylene glycol), thiodiglycol; the triglycidyl ether of tris(hydroxyphenyl)methane; the polyglycidyl ethers of a phenol or alkyl or halogen substituted phenol-aldehyde acid catalyzed product (novolac resins); the tetraglycidyl amines of: 4,4'-diaminodiphenylmethane, 4,4'-diaminostilbene, N,N'-dimethyl-4,4'-diaminostilbene, 4,4'-diaminobenzanilide, 4,4'-diaminobiphenyl, 4,4'-diamino-alpha-methylstilbene; the polyglycidyl ether of the condensation product of: a dicyclopentadiene or an oligomer thereof and a phenol or alkyl or halogen substituted phenol; the advancement reaction products of the aforesaid di and polyglycidyl ethers with aromatic di and polyhydroxyl or carboxylic acid containing compounds including, for example, hydroquinone, resorcinol, catechol, 2,4-dimethylresorcinol, 4-chlororesorcinol, tetramethylhydroquinone, 4,4'-isopropylidenediphenol (bisphenol A), 4,4'-dihydroxydiphenylmethane, 4,4'-thiodiphenol, 4,4'-sulfonyldiphenol, 2,2'-sulfonyldiphenol, 4,4'-dihydroxydiphenyl oxide, 4,4'-dihydroxybenzophenone, 1,1-bis(4-hydroxyphenyl)-1-phenylethane, 4,4'-bis(4(4-hydroxyphenoxy)phenylsulfone)diphenyl ether, 4,4'-dihydroxydiphenyl disulfide, 3,3',3,5'-tetrachloro-4,4'-isopropylidenediphenol, 3,3',3,5'-tetrabromo-4,4'-isopropylidenediphenol, 3,3'-dimethoxy-4,4'-isopropylidenediphenol, 4,4'-dihydroxybiphenyl, 4,4'-dihydroxy-alpha-methylstilbene, 4,4'-dihydroxybenzanilide, bis(4-hydroxyphenyl)terephthalate, N,N'-bis(4-hydroxyphenyl)terephthalamide, bis(4'-hydroxybiphenyl)terephthalate, 4,4'-dihydroxyphenylbenzoate, bis(4'-hydroxyphenyl)-1,4-benzenediimine; 1,1'-bis(4-hydroxyphenyl)cyclohexane, phloroglucinol, pyrogallol, 2,2',5,5'-tetrahydroxydiphenyl sulfone, tris(hydroxyphenyl)methane, dicyclopentadiene diphenol, tricyclopentadiene diphenol, terephthalic acid, isophthalic acid, 4,4'-benzanilidedicarboxylic acid, 4,4'-phenylbenzoatedicarboxylic acid, 4,4'-stilbenedicarboxylic acid, adipic acid; or any combination of the aforementioned epoxy resins.

Advancement reaction of di- and polyglycidyl ethers can be performed by the known methods which usually includes combining one or more suitable compounds having an average of more than one active hydrogen atom per molecule, including, for example, dihydroxy aromatic, dithiol or dicarboxylic acid compounds or compounds containing one primary amine or amide group or two secondary amine groups and the di- or polyglycidyl ethers in the presence or absence of a suitable solvent with the application of heat and mixing to effect the advancement reaction. The epoxy resin and the compound having more than one active hydrogen atom per molecule are reacted in amounts which provide suitably from about 0.01:1 to about 0.95:1, more suitably from about 0.05:1 to about 0.8:1, most suitably from about 0.10:1 to about 0.5:1 active hydrogen atoms per epoxy group. The advancement reaction can be conducted at atmospheric, superatmospheric or subatmospheric pressures at temperatures of from about 20° C. to about 260° C., more suitably from about 80° C. to about 240° C., most suitably from about 100° C. to about 200° C. The time required to complete the advancement reaction depends upon the temperature employed. Higher temperatures require shorter periods of time whereas lower temperatures require longer periods of time. Generally, times of from about 5 minutes to about 24 hours, more suitably from about 30 minutes to about 8 hours, most suitably from about 30 minutes to about 4 hours are employed. A catalyst, including, for example, phosphines, quaternary ammonium compounds, phosphonium compounds and tertiary amines, is frequently added to facilitate the advancement reaction and is usually employed in quantities of from about 0.01 to about 3, preferably from about 0.03 to about 1.5, most preferably from about 0.05 to about 1.5 percent by weight based upon the weight of the epoxy resin.

CURING AGENTS, CURING AND CURABLE BLENDS

The aromatic anhydride compositions which contain at least one rodlike mesogenic moiety and at least two anhydride groups per molecule, wherein each of said aromatic anhydride groups is linked to the mesogen via an ester linkage of the present invention can be employed to cure epoxy resins and thiirane resins. They can be employed alone or in combination with other curing agents and/or curing catalysts as described in *Handbook of Epoxy Resins* by Lee and Neville, McGraw-Hill, 1967 which is incorporated herein by reference in its entirety.

The curable compositions of the present invention are prepared by mixing together one or more aromatic anhydrides which contain at least one rodlike mesogenic moiety and at least two anhydride groups per molecule or the reaction product of one or more of said aromatic anhydrides with at least one compound which is reactive with an anhydride group to provide a reaction product which is reactive with an epoxide or thiirane group, one or more epoxy or thiirane resins and, optionally, one or more epoxy resin curing agents different from the aromatic anhydride or reaction product thereof and/or curing catalysts. For epoxy resins and/or curing agents which are solids it is, frequently, convenient to first melt the epoxy resin, then dissolve the curing agent therein. It is also operable to melt the curing agent then dissolve the epoxy resin therein, although this is generally less preferred.

The aromatic anhydrides which contain at least one rodlike mesogenic moiety and at least two anhydride groups per molecule or the reaction product of one or more of said aromatic anhydrides with at least one compound which is reactive with an anhydride group to provide a reaction product which is reactive with an epoxide or thiirane group and, optionally, curing agents are employed in amounts which will effectively cure the curable mixture, with the understanding that these amounts will depend upon the particular curing agent(s) and epoxy resin employed. Generally, suitable amounts are from about 0.80:1 to about 1.50:1, preferably from about 0.95:1 to about 1.05:1 equivalents of anhydride group and, optionally, hydrogen reactive with an epoxide group per equivalent of epoxide group in the epoxy resin at the conditions employed for curing.

When an additional curing agent is employed in addition to the aromatic anhydride of the present invention, the aromatic anhydride of the present invention is employed in amounts which provide at least about 5, preferably at least about 25, more preferably at least about 50 eauivalent percent of the total equivalents contributed by all of the curing agents employed.

Curing of the curable compositions of the present invention can be conducted at atmospheric, superatmospheric or subatmospheric pressures at temperatures of from about 0° C. to about 300° C., preferably from about 50° C. to about 240° C., more preferably from about 150° C. to about 220° C. The time required to complete curing depends upon the individual components in the curable composition and the temperature employed. Higher temperatures require shorter periods of time whereas lower temperatures require longer periods of time. Generally, however, times of from about 15 minutes to about 48 hours, preferably from about 15 minutes to about 8 hours, more preferably from about 30 minutes to about 3 hours are suitable.

It is also operable to partially cure (B-stage) the curable compositions of the present invention and then complete the curing at a later time. B-staging can be accomplished by heating at a temperature for such a time that only partial curing is produced. Usually, the cure temperatures are employed for B-staging, however, for a shorter period of time. Generally, the extent of B-staging is monitored using analytical methods such as viscosity measurement, differential scanning calorimetry for residual cure energy or infrared spectrophotometric analysis for unreacted curable functional groups.

It is frequently of value to "B-stage" the curable compositions of this invention in order to chain extend the resin. This chain extension is required for some mesogen containing curable compositions in order to achieve liquid crystal character. B-staging can also be employed to increase the temperature range at which a particular curable composition is liquid crystalline and to control the degree of crosslinking during the final curing stage.

CURING CATALYSTS

Curing catalysts can be employed, if desired, to enhance the cure between the epoxy or thiirane resin(s) and the curing agent(s). Particularly suitable curing catalysts include boron trifluoride, boron trifluoride etherate, aluminum chloride, ferric chloride, zinc chloride, silicon tetrachloride, stannic chloride, titanium tetrachloride, antimony trichloride, boron trifluoride monoethanolamine complex, boron trifluoride triethanolamine complex, boron trifluoride piperidine complex, pyridine-borane complex, diethanolamine borate, zinc fluoroborate, mixtures thereof and the like.

The curing catalysts are employed in amounts which will effectively cure the curable composition, however, these amounts will depend upon the particular anhydride employed and the epoxy or thiirane resin employed. Generally suitable amounts include, for example, 0.001 to about 2 percent by weight of the total epoxy or thiirane resin used. It is frequently of benefit to employ one or more of the curing catalysts in the curing of the curable compositions of the present invention. This is generally done to accelerate or otherwise modify the curing behavior obtained when a curing catalyst is not used.

OTHER CURING AGENTS

Suitable curing agents which can optionally be used to prepare the curable compositions of the present invention include, for example, aliphatic, cycloaliphatic, polycycloaliphatic or aromatic primary monoamines; aliphatic, cycloaliphatic, polycycloaliphatic or aromatic primary and secondary polyamines; carboxylic acids and anhydrides thereof; aromatic hydroxyl containing compounds; imidazoles; guanidines; urea-aldehyde resins; melamine-aldehyde resins; alkoxylated urea-aldehyde resins; alkoxylated melamine-aldehyde resins; amidoamines; epoxy resin adducts all, none, or a part of which may contain one or more mesogenic moieties; combinations thereof and the like. Particularly suitable curing agents which do not contain mesogenic moieties include, for example, methylenedianiline, dicyandiamide, ethylene diamine, diethylenetriamine, triethylenetetramine, tetraethylenepentamine, urea-formaldehyde resins, melamine-formaldehyde resins, methylolated urea-formaldehyde resins, methylolated melamine-formaldehyde resins, phenol-formaldehyde novolac resins, cresol-formaldehyde novolac resins, sulfanilamide, diaminodiphenylsulfone, diethyltoluenediamine, t-butyltoluenediamine, bis-4-aminocyclohexylamine, isophoronediamine, diaminocyclohexane, hexamethylene-diamine, piperazine, aminoethylpiperazine, 2,5-dimethyl-2,5-hexanediamine, 1,12-dodecanediamine, tris-3-aminopropylamine, combinations thereof and the like. Particularly suitable curing agents which contain mesogenic moieties include, for example, 4,4'-diaminostilbene, 4,4'-diamino-alpha-methylstilbene, 4,4'-diaminobenzanilide, 4,4'-bis(aminophenoxy)-alpha-methylstilbene, 4,4'-dihydroxy-alpha-methylstilbene, 4,4'-dihydroxy-alpha-cyanostilbene, 4,4'-dihydroxystilbene, 4,4'-dihydroxy-2,2'-dimethylazoxybenzene, 4,4'-dihydoxy-$\alpha,\alpha'$-diethylstilbene, 4,4'-dihydroxybenzanilide, 4,4'dihydroxybiphenylbenzoate, bis(4-hydroxyphenyl)terephthalate, bis(N,N'-4-hydroxyphenyl)terephthalamide, bis(4'-dihydroxybiphenyl)terephthalate, 4,4'-dihydroxyphenylbenzoate, 1,4-bis(4'-hydroxyphenyl-1'-carboxamide)benzene, 1,4-bis(4'-hydroxyphenyl-1'-carboxy)benzene, 4,4'-bis(4"-hydroxyphenyl-1"-carboxy)biphenyl, bis(4'-hydroxyphenyl)-1,4-benzenediimine, 4,4'-benzanilidedicarboxylic acid, 4,4'-phenylbenzoatedicarboxylic acid, 4,4'-stilbenedicarboxylic acid, or any combination thereof and the like.

ORIENTATION

As a result of the mesogenic moieties being present in one or more of the components of the curable compositions of the present invention, electric or magnetic fields, drawing and/or shear stresses can be applied before and/or during processing and/or curing for the purpose of orienting the liquid crystal phase contained or developed therein. The effect of this orientation is an improvement in mechanical properties. As specific examples of these methods, Finkelmann, et al, *Macromol. Chem.*, volume 180, pages 803–806 (March, 1979) induced orientation in thermotropic thermoplastic methacrylate copolymers containing mesogenic side chain groups decoupled from the main chain via flexible spacers in an electric field. Within the nematic liquid crystalline transition temperature range for one of the copolymers, homeotropic orientation was achieved with a half-time of approximately 10 seconds at 8 volts d.c. At higher voltages, turbulent flow disrupted the homeotropic orientation. A second copolymer within the nematic liquid crystalline transition temperature range gave reversible homeotropic orientation with an orientation time of less than 200 mseconds in a 50 Hz d.c. electric field. Threshold voltage was approximately 6 volts and the relaxation half-time was approximately 5 seconds. Thus, for the orientation of the curable blends of the present invention which contain or develop liquid crystal moieties, it is frequently of value to conduct simple preliminary experiments over the range of experimental conditions to be employed, including voltage to be applied and time to be used for application of the voltage to a given mesophase at a given temperature. In this manner, an indication of the critical electric field strength, orientation time and relaxation time for the mesophase to be oriented can be obtained and conditions not conducive to orientation, such as flow instability, can be avoided. Orientation of mesogenic side chain groups decoupled from the thermoplastic polymer main chain via flexible spacers in a magnetic field has been demonstrated by Roth and Kruecke, *Macromol. Chem.*, volume 187, pages 2655–2662 (November, 1986). Within the broad temperature range of approximately −120° C. to 200° C., orientation of the polymers was observed (anisotropy in the motional processes as shown by change in line width of proton magnetic resonance signals as a function of temperature). In order to achieve macroscopic orientation in a magnetic field of about 2 T it was found that the choice of proper temperature is important such that the ordering effect of the magnetic field overcomes the disordering effect of thermal motion and that sufficient molecular mobility is present to allow for the ordering to occur. Furthermore, this proper temperature was found to vary as a function of the particular mesogen-containing polymer to be oriented. Thus, for the orientation of the curable blends of the present invention which contain or develop liquid crystal moieties, it is frequently of value to conduct simple preliminary experiments over the range of experimental conditions to be employed, including the magnetic field to be applied and time to be used for application of the magnetic field to a given mesophase at a given temperature. In this manner, an indication of the critical magnetic field strength, orientation time and relaxation time for the mesophase to be oriented can be obtained and conditions not conducive to orientation, such as improper temperature range, can be avoided. Magnetic field induced orientation of mesogenic main chain containing thermoplastic polymers has been demonstrated by Moore, et al, *ACS Polymeric Materials Sciences and Engineering*, volume 52, pages 84–86 (April–May, 1985). At the melt temperature for the liquid crystalline thermoplastic copolymer of p-hydroxybenzoic acid (80%) and polyethylene terephthalate (20%) the threshold for orientation was found to be approximately 0.4 T, with the degree of orientation (order parameter) depending on the strength of the magnetic field. Relaxation of the orientation once the polymer is removed from the magnetic field depends on the amount of time that the polymer spent in the magnetic field. Thus, for the liquid crystalline thermoplastic polymer maintained in a 6.3 T magnetic field, maximum relaxation time was approximately 15 minutes, while the liquid crystalline thermoplastic polymer maintained in a 2 T or less magnetic field exhibited a maximum relaxation time of less than one minute. An equation delineating the balance between the ordering effect of the magnetic field and the disordering effect of thermal motion is given for domains of radius a as follows:

$X_a \cdot Ht^2 \cdot a^2 = kT/a$ where Ht is the threshold magnetic field and $X_a$ is the difference between the magnetic susceptibilities of the polymer when aligned parallel and perpendicular to the field.

Magnetic and electric field orientation of low molecular weight mesogenic compounds is discussed by W. R. Krigbaum in *Polymer Liquid Crystals*, pages 275–309 (1982) published by Academic Press, Inc.

In addition to orientation by electric or magnetic fields, polymeric mesophases can be oriented by shear forces, for example, using shear rates as low as 0.1 $\sec^{-1}$ to as high as 10,000 $\sec^{-1}$, which are induced by drawing and/or flow through dies, orifices and mold gates. A general discussion for orientation of thermotropic liquid crystal polymers by this method is given by S. K. Garg and S. Kenig in *High Modulus Polmers,* pages 71–103 (1988) published by Marcel Dekker, Inc. and S. Keneg, *Polymer Engineering and Science*, volume 29, number 16, pages 1136–1141 (August, 1989). For the orientation by shear forces of the curable blends of the present invention which contain or develop liquid crystal moieties, it is frequently of value to conduct simple preliminary experiments over the range of experimental conditions to be employed, including total shear strain to be applied and time to be used for application of the shear force to a s given mesophase at a given temperature. In this manner, an indication of the critical total shear strain, orientation time and relaxation time for the mesophase to be oriented can be obtained and conditions not conducive to orientation, such as tumbling of domain structure, can be avoided. For the mesomorphic systems this shear orientation can be produced by processing methods such as injection molding, extrusion, pultrusion, filament winding, filming and prepreging.

OTHER COMPONENTS

The curable compositions of the present invention can be blended with other materials such as, for example, solvents or diluents, fillers, pigments, dyes, flow modifiers, thickeners, reinforcing agents, mold release agents, wetting agents, stabilizers, fire retardant agents, surfactants or any combination thereof and the like.

These additives are added in functionally equivalent amounts, e.g., the pigments and/or dyes are added in quantities which will provide the Composition with the desired color; however, they are suitably employed in amounts of from about zero to about 20, more suitably from about 0.5 to about 5, most suitably from about 0.5 to about 3 percent by weight based upon the weight of the total blended composition containing such additives.

Solvents or diluents which can be employed herein include, for example, hydrocarbons, ketones, glycol ethers, aliphatic ethers, cyclic ethers, esters, or any combination thereof and the like. Particularly suitable solvents or diluents include, for example, toluene, xylene, methylethylketone, methylisobutylketone, diethylene glycol methyl ether, dipropylene glycol methyl ether, tetrahydrofuran, dioxane, propylene glycol methyl ether or any combination thereof and the like.

The modifiers such as thickeners, flow modifiers and the like can be suitably employed in amounts of from zero to about 10, more suitably from about 0.5 to about 6, most suitably from about 0.5 to about 4 percent by weight based upon the weight of the total composition.

Reinforcing materials which can be employed herein include natural and synthetic fibers in the form of woven fabric, mats, monofilament, multifilament, unidirectional fibers, rovings, random fibers or filaments, inorganic fillers or whiskers, hollow spheres, and the like. Suitable reinforcing materials include glass, ceramics, nylon, rayon, cotton, aramid, graphite, polyalkylene terephthalates, polyethylene, polypropylene, polyesters or any combination thereof and the like.

Suitable fillers which can be employed herein include, for example, inorganic oxides, ceramic microspheres, plastic microspheres, glass microspheres, inorganic whiskers, calcium carbonate or any combination thereof and the like.

The fillers can be employed in amounts suitably from about zero to about 95, more suitably from about 10 to about 80, most suitably from about 40 to about 60 percent by weight based upon the weight of the total composition.

UTILIZATION

The curable compositions of the present invention can be employed in coating, casting, encapsulation, electronic or structural laminate or composite, filament winding, molding, and the like applications.

The following Examples are for illustrative purposes only and are not to be construed as to limiting the scope of the invention in any manner.

EXAMPLE 1

A. Synthesis of 4,4'-Dihydroxy-alpha-methylstilbene

Phenol (376.44 grams, 4.0 moles), chloroacetone (192.77 grams, 2.0 moles as chloroacetone) and methylene chloride (300 grams) are added to a reactor and cooled to −10° C. with stirring. The chloroacetone used is a commercial grade containing 96% chloroacetone. Concentrated sulfuric acid (196.16 grams, 2.0 mole) is added dropwise to the stirred solution over a thirty minute period and so as to maintain the reaction temperature between −10 and −11° C. After 150 minutes of post reaction between a −10 to −11° C. temperature range, the viscous, opaque, orange colored oil product is mixed with iced deionized water (500 milliliters). The oil product is separated then washed with a second portion (500 milliliters) of deionized water. After separation, the recovered oil product is added to a 2 liter beaker along with ethanol (250 milliliters) and stirred to provide a solution. Deionized water (250 milliliters) is added to the stirred solution and heating commences. As the temperature of the mixture increased, the stirred mixture began to clear. Each time clearing is observed, sufficient deionized water is added to induce cloudiness, followed by continuation of the mixing and heating. Once the temperature reaches 70° C., a massive precipitation of white crystalline plates occurs and is followed by immediate coalesence of the precipitated product to an oil. The oil layer is recovered by decantation of the water layer and ethanol (250 milliliters) is added. Deionized water is again added to the stirred solution as heating commences, in an amount sufficient to induce cloudiness each time clearing is observed. Once the temperature reaches 90° C., a massive precipitation of white crystalline plates again occurs. At this time, stirring is stopped and the crystalline slurry is chilled to 5° C. and held therein for 12 hours. The crystalline product is recovered by filtration of the chilled crystalline slurry and combined with deionized water (800 milliliters), then stirred with heating to 100° C. After maintaining the stirred slurry at 100° C. for thirty minutes, the crystalline product is recovered by filtration then dried in a vacuum oven at 100° C. and 5 mm Hg to a constant weight of 251.3 grams. Proton magnetic resonance spectroscopy and Fourier transform infrared spectrophotometric analysis confirm the product structure.

B. Synthesis of the bis(2-Hydroxyethylether) of 4,4'-Dihydroxy-alpha-methylstilbene 4,4'-Dihydroxy-alpha-methylstilbene (79.19 grams, 0.70 hydroxyl equivalent) from A. above, ethylene carbonate (67.81 grams, 0.77 mole), 4(N,N-dimethylamino)pyridine (0.147 gram, 0.01 percent by weight of the 4,4'dihydroxy-alpha-methylstilbene and ethylene carbonate used) are added to a reactor and heated to 80° C. with stirring under a nitrogen atmosphere. Once the 80° C. temperature is achieved, triethylamine (1.47 grams, 1.0 percent by weight of the 4,4'-dihydroxy-alpha-methylstilbene and ethylene carbonate used) is added to the reactor followed by continuation of the heating to 135° C. Once the 135° C. reaction temperature is achieved, exothermicity continued heating of the solution to a maximum of 150° C. Twenty minutes after reaching this maximum exotherm temperature, the reactor cools to 135° C. and is maintained therein for the next 157 minutes followed by removal of a sample for thin layer chromatographic analysis. Thin layer chromatography is completed on a silica gel plate using a 3/2/2/2 volume mixture of hexane/ethyl acetate/chloroform/methanol as the eluent at 24° C. followed by visualization via treatment of the plate with 5% phosphomolybdic acid in ethanol and then heat. The analysis demonstrates that complete conversion of the 4,4'-dihydroxy-alpha-methylstilbene reactant (Rf=0.634) to a single product (Rf=0.366) occurs. After completion of the thin layer chromatography, (requires 10 minutes), toluene (350 milliliters) is added to the reactor causing cooling to 80° C. with massive precipitation of crystalline product. Heating to reflux provided a toluene solution which is allowed to cool to room temperature (24° C.) and is maintained therein for the next 15 hours. The resultant crystalline slurry is filtered and the crystalline product recovered then ground to a fine powder under fresh toluene (75 milliliters). After filtration of the crystalline suspension in toluene, the recovered product is dried in a vacuum oven at 90° C. and 5 mm Hg to a constant weight of 104.2 grams of light yellow colored powder. Proton magnetic resonance spectroscopy confirm the product structure as the bis(2-hydroxyethylether) of 4,4'-dihydroxy-alpha-methylstilbene (—CH$_3$ singlet at 2.14 ppm, —CH$_2$ quartet centered at 3.69 ppm, —CH$_2$ triplet centered at 3.95 ppm, —OH triplet centered at 4.86 ppm, aromatic multiplet and =CH between 6.47 and 7.45 ppm in the proper integrated ratio). Differential scanning calorimetry of a portion (11.95 milligrams) of the product from 30 to 200° C. using a rate of heating of 10° C. per minute under a stream of nitrogen flowing at 35 cubic centimeters per minute reveals a single melting point endotherm centered at 136° C.

C. Synthesis of the bis (Anhydride Ester) of the bis (2-Hydroxyethylether) of 4,4-Dihydroxy-alpha-methylstilbene bis(2-Hydroxyethylether) of 4,4'-dihydroxy-alpha-methylstilbene (45.50 grams, 0.2895 hydroxyl equivalent) from B. above is dissolved in warm tetrahydrofuran (400 grams) and added to a pressure equalizing addition funnel maintained under a nitrogen atmosphere. Trimellitic anhydride chloride (60.95 grams, 0.2895 mole), tetrahydrofuran (200.0 grams) and chloroform (500 grams) are added to a reactor and maintained under a nitrogen atmosphere with stirring to provide a solution. The resultant solution is cools in an ice bath to 5° C., then potassium carbonate (44.01 grams, 0.3185 mole) and 4-(N,N-dimethylamino)pyridine (1.07 grams, 1.0 percent by weight of the bis(2-hydroxyethyl-ether) of 4,4'-dihydroxy-alpha-methylstilbene and trimellitic anhydride chloride used) are added to the reactor forming a slurry. Ten minutes later, dropwise addition of the bis(2-hydroxyethylether) of 4,4'-dihydroxy-alpha-methylstilbene solution in tetrahydofuran commences and is completed 60 minutes later, during which time the reaction temperature is maintained between 0° and 5° C. At this time, the ice bath cooling the reactor exterior is no longer replenished and the product slurry is allowed to warm to room temperature (24° C.) over the next 314 minutes. After 38.5 hours of post reaction at the 24° C. temperature, the product slurry is concentrated to a dry product via removal of tetrahydrofuran and chloroform by rotary evaporation at 60° C. and 2 mm Hg. The product is ground to a fine powder then washed with deionized water (300 milliters) for two minutes in a Waring blender. The resultant slurry is then centrifuged and the supernatant decanted from the precipitated cake of product. The recovered precipitate is mixed with ethanol (100 milliliters) followed by filtration to recover the solid product. The solid product is again mixed with ethanol (100 milliliters) followed by filtration to recover the solid product. After drying in a vacuum oven at 110° C. and 4 mm Hg the product is recovered at a constant weight of 56.1 grams of bright yellow colored powder. Fourier transform infrared spectrophotometric analysis of a potassium chloride pellet of the product demonstrates the presence of anhydride carbonyl group absorbances (1855 with 1842 as a shoulder and 1782 cm$^{-1}$) and the ester carbonyl group absorbance (1728 cm$^{-1}$). Proton magnetic resonance spectroscopy confirm the product structure as the bis(trimellitic anhydride ester) of the bis(2hydroxyethylether) of 4,4'-dihydroxy-alpha-methylstilbene (—CH$_3$ singlet at 2.13 ppm, —CH$_2$ multiplets centered at 4.33 and 4.60 ppm, complete dissappearance —OH triplet centered at 4.86 ppm, aromatic multiplet and =CH between 6.72 and 8.76 ppm in the proper integrated ratio).

EXAMPLE 2

Characterization of the bis(Anhydride Ester) of the bis(2-Hydroxyethyl-ether) of 4,4'-Dihydroxy-alpha-methylstilbene for Liquid Crystallinity A portion (12.97 milligrams) of the bis(anhydride ester) of the bis(2-hydroxyethylether) of 4,4'-dihydroxy-alpha-methylstilbene from Example 1-C is analyzed by differential scanning calorimetry using a heating rate of 10° C. per minute and a temperature range of 30 to 350° C. under a stream of nitrogen flowing at 35 cubic centimeters per minute. The results are provided in Table I.

TABLE I

| Observed Transition Temperatures (°C.) midpoint/range | Enthalpy (J/g) | Comments |
| --- | --- | --- |
| 104/49–146 | 57.3 | single endotherm |
| 151/147–158 | 3.7 | single endotherm |
| 206/179–214 | 4.0 | single endotherm |
| 231/215–262 | 15.9 | single endotherm |

The 262° C. end point of the last endothermic transition is immediately followed by exothermic decomposition.

Analysis of the bis(anhyride ester) via crosspolarized light microscopy is completed using a microscope equipped with a programmable hot stage using a heating rate of 10° C. per minute. The results obtained for a single heating from 24 to 290° C. are provided in Table II.

TABLE II

| Observed Transition Temperatures (°C.) | Comments |
| --- | --- |
| 24 | Solid with low level of birefringence. |
| 60 | Solid with increasing birefringence. |
| 100 | Birefringent solid. |
| 160 | First fluidity noted, strong shear birefringence. |
| 180 | Highly shear birefringent viscous fluid. |
| 228 | Highly shear birefringent thin fluid. |
| 290 | Shear birefringent thin fluid, product has darkened. |

EXAMPLE 3

Preparation, Curing and Characterization of a Curable Mixture of the bis(Anhydride Ester) of the bis(2-Hydroxyethylether) of 4.4'-Dihydroxy-alpha-methylstilbene and the Diglycidyl Ether of 4,4'-Dihydroxy-alpha-methylstilbene A portion (0.7009 grams, 0.00212 anhydride equivalent) of the bis(anhydride ester) of the bis(2-hydroxyethylether) of 4,4'-dihydroxy-alpha-methylstilbene from Example 1-C and a portion (0.3693 grams, 0.00212 epoxide equivalent) of the diglycidyl ether of 4,4'-dihydroxy-alpha-methylstilbene are added to a mortar and ground under a nitrogen atmosphere to a homogeneous powder. The diglycidyl ether of 4,4'-dihydroxy-alpha-methylstilbene used is a recrystallized product with an epoxide equivalent weight (EEW) of 174.545. Analysis of the diglycidyl ether via crosspolarized light microscopy is completed using a microscope equipped with a programmable hot stage using a heating rate of 10° C. per minute followed by cooling at a rate of 10° C. per minute after isotropization is completed. This analysis reveals an isotropization temperature of 135.5° C., onset of liquid crystallinity at 99° C. and onset of crystallization at 75° C. The diglycidyl ether is a monotropic liquid crystal with nematic texture. Portions (10.4 and 11.0 milligrams) of the curable mixture are analyzed by differential scanning calorimetry using a heating rate of 10° C. per minute and a temperature range of 30° to 350° C. under a stream of nitrogen flowing at 35 cubic centimeters per minute. A single exotherm with an onset at 131.1° C. and a maximum at 159.0° C. and an enthalpy of 101.2 joules/gram is obtained (average of the two samples). The onset of this exotherm is substantially below the baseline for the heating curve due to endothermic melting of the sample. After allowing the samples to cool to 30° C., a second analysis is completed using the aforementioned conditions. A glass transition temperature of 182.5° C. is obtained (average of two samples), with no other events being observed. The cured product recovered from the differential scanning calorimetry analysis is a fused, homogeneous, opaque, light yellow colored, solid. When fractured to smaller pieces and examined via crosspolarized light microscopy, a high level of birefringence is observed.

EXAMPLE 4

A. Synthesis of the bis(Anhydride Ester) of 4,4-Dihydroxy-alpha-methylstilbene Trimellitic anhydride chloride (10.53 grams, 0.05 mole) and anhydrous 1,4-dioxane (400 milliliters) are added to a reactor and maintained under a nitrogen atmosphere with stirring to provide a solution. The resultant solution is cooled in an ice bath to 12° C., then a solution of 4,4'-dihydroxy-alpha-methylstilbene (5.66 grams, 0.05 hydroxyl equivalent), anhydrous 1,4-dioxane (50 milliliters) and pyridine (0.05 mole, 3.96 grams) is added dropwise to the reactor from a pressure equalizing addition funnel at a rate so as to maintain the temperature at 10°–12° C. The 4,4'-dihydroxy-alpha-methylstilbene used contains 98.8 area percent of the diphenol and 1.2 area percent of a single dimeric component as determined by high pressure liquid chromatographic analysis (uv detector set at 254 nm). After 70 minutes, addition of the solution is completed. After and additional 11 minutes, the ice bath cooling the reactor exterior is removed and the product slurry is allowed to warm to 19° C. over the next 236 minutes. The product slurry is filtered under a nitrogen atmosphere through a bed of diatomaceous earth with washing of the filter cake using anhydrous 1,4-dioxane (250 milliliters). The clear filtrate is concentrated to approximately 100 milliliters total volume via removal of 1,4-dioxane by rotary evaporation at 90° C. under vaccuum. The resultant slurry of crystalline product is held under a nitrogen atmosphere for 24 hours followed by filtration to recover the solid product. After drying in a vacuum oven at 100° C. and 1 mm Hg the product is recovered at a constant weight of 9.3 grams of light yellow colored powder. During the drying process, a minor amount of pyridine hydrochloride sublimed out of the product. Fourier transform infrared spectrophotometric analysis of a potassium chloride pellet of the product demonstrated the presence of anhydride carbonyl group absorbances (1868 and 1782 (with 1815 as a shoulder) cm$^{-1}$) and the ester carbonyl group absorbance (1742 cm$^{-1}$). Proton magnetic resonance spectroscopy additionally confirms the product structure.

EXAMPLE 5

Characterization of the bis(Anhydride Ester) of 4,4'-Dihydroxy-alpha-methylstilbene for Liquid Crystallinity Portions (8.3 and 11.0 milligrams) of the bis(anhydride ester) of 4,4'-dihydroxy-alpha-methylstilbene from Example 4 are analyzed by differential scanning calorimetry using a heating rate of 10° C. per minute and a temperature range of 30° to 300° C. under a stream of nitrogen flowing at 35 cubic centimeters per minute. The results obtained (average of the two samples) are provided in Table III.

TABLE III

| Observed Transition Temperatures (°C.) midpoint/range | Enthalpy (J/g) | Comments |
|---|---|---|
| 143/105–129 | 8.1 | single endotherm |
| 196/144–210 | 58.1 | single endotherm |
| 236/210–252 | 10.9 | single endotherm |

Analysis of the bis(anhydride ester) via crosspolarized light microscopy is completed using a microscope equipped with a programmable hot stage using a heating rate and then a cooling rate of 10° C. per minute. The results obtained for a single heating from 30° to 250° C. followed by cooling are provided in Table IV.

TABLE IV

| Observed Transition Temperatures (°C.) | Comments |
|---|---|
| 30 | Birefringent, crystalline solid |
| 111 | Softening |
| 147 | Highly viscous, birefringent fluid |
| 182 | Thin, birefringent fluid, nematic textures present |
| 205 | Thin, birefringent fluid, nematic textures present, stir opalescent |
| 213 | Decreasing birefringence in fluid |
| 248 | Isotropization complete |
| 250 | Begin cooling |
| 212 | Birefringent fluid with nematic texture reforms, stir opalescent |
| 200 | Highly viscous, birefringent fluid |
| 178 | Barely fluid, highly birefringent |
| 145 | Immobile but soft, still has nematic texture |

EXAMPLE 6

Preparation, Curing and Characterization of a curable Mixture of the bis(Anhydride Ester) of 4,4'-Dihydroxy-alpha-methylstilbene and the Diglycidyl Ether of 4,4'-Dihydroxy-alpha-methylstilbene A portion (0.0883 grams, 0.000307 anhydride equivalent) of the bis(anhydride ester) of 4,4'-dihydroxy-alpha-methylstilbene from Example 1-C and a portion (0.0545 grams, 0.000307 epoxide equivalent) of the diglycidyl ether of 4,4'-dihydroxy-alpha-methylstilbene are added to a mortar and ground under a nitrogen atmosphere to a homogeneous powder. The diglycidyl ether of 4,4'-dihydroxy-alpha-methylstilbene used is a recrystallized product with an epoxide equivalent weight (EEW) of 177.34. Analysis of the diglycidyl ether via crosspolarized light microscopy is completed using a microscope equipped with a programmable hot stage using a heating rate of 10° C. per minute followed by cooling at a rate of 10° C. per minute after isotropization is completed. This analysis reveals an isotropization temperature of 134.5° C., onset of liquid crystallinity at 107.8° C. and onset of crystallization at 73° C. The diglycidyl ether is a monotropic liquid crystal with nematic texture. Portions (10.6 and 11.0 milligrams) of the curable mixture are analyzed by differential scanning calorimetry using a heating rate of 10° C. per minute and a temperature range of 30° to 300° C. under a stream of nitrogen flowing at 35 cubic centimeters per minute. A single exotherm with an onset at 110.6° C. and a maximum at 134.3° C. and an enthalpy of 97.8 joules/gram is obtained (average of two samples). The endpoint of the exotherm tails out to 203.7° C. and is immediately followed by a minor (5.6 joules/gram) endotherm with a minimum at 215.3° C. and an endpoint of 223.9° C. Immediately after this endpoint, a gradual exothermic rise begins. After allowing the samples to cool to 30° C., a second analysis is completed using the aforementioned conditions. No glass transition temperature is obtained, with a gradual exothermic rise with an onset at 240.0° C. observed. The cured product recovered from the differential scanning calorimetry analysis is a fused, brown colored, solid. When fractured to smaller pieces and examined via crosspolarized light microscopy, a high level of birefringence is observed.

Analysis of the curable mixture via crosspolarized light microscopy is completed using a microscope equipped with a programmable hot stage using a heating rate of 10° C. per minute. The following results are obtained for a single heating from 30° to 250° C.:

TABLE V

| Observed Transition Temperatures (°C.) | Comments |
|---|---|
| 30 | Birefringent, crystalline solid |
| 117 | Partial melting observed |
| 135 | Fused solid with liquid crystal textures forms |
| 182 | Thin fluid, birefringent, nematic textures present |
| 250 | Unchanged from prior observation |

The cured product at room temperature is an opaque solid with nematic liquid crystalline textures.

Analysis of a second portion of the curable mixture via crosspolarized light microscopy is completed using a microscope equipped with a programmable hot stage. The sample is applied directly to the hot stage which had been preheated to 200° C., Melting immediately occurs followed by thermosetting to an opaque solid within 5 seconds. Nematic textures are observed with birefringent striations present in the flow direction of the resin.

What is claimed is:

1. An aromatic anhydride compound which contains at least one rodlike mesogenic moiety and at least two anhydride groups per molecule, wherein each of said aromatic anhydride groups is linked to the mesogen via an ester linkage which is represented by the following general Formula IV

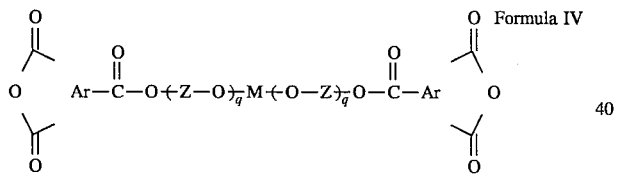

Formula IV wherein Ar is a mono- or multi-ring aromatic group or inertly substituted mono- or multi-ring aromatic group, Z is a divalent aliphatic, cycloaliphatic or polycycloaliphatic group and q is an integer from zero to about 10, and M is a divalent rodlike mesogenic moiety represented by the following general Formula III

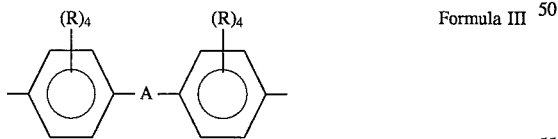

Formula III wherein each A is independently $-CR^2=CR^2-$, $-C\equiv C-$, $-N=N-$, $-CR^2=N-$, $-N=CR^2-$, $-O-CO-$, $-CO-O-$, $-S-CO-$, $-CO-S-$, $-NR^2-CO-$, $-CO-NR^2-$, $-CR^2=N-N=CR^2-$, $-CO-CR^2=CR^2-$, $-CR^2=CR^2-CO-$, $-CO-O-N=CR^2-$, $-CR^2=N-O-OC-$, $-CO-NR^2-NR^2-OC-$, $-CR^2=CR^2-O-OC-$, $-CO-O-CR^2=CR^2-$, $-O-CO-CR^2=CR^2-$, $-CR^2=CR^2-CO-O-$, $-(CHR^2)_{n'}-O-CO-CR^2=CR^2-$, $-CR^2=CR^2-CO-O-(CHR^2)_{n'}-$, $-(CHR^2)_{n'}-$, $-CO-O-CR^2=CR^2-$, $-CR^2=CR^2-O-CO-$ $(CHR^2)_{n'}$, $-CH_2-CH_2-CO-O-$, $-O-OC-CH_2-CH_2-$, $-C\equiv C-C\equiv C-$, $-CR^2=CR^2-CR^2=CR^2-$, $-CR^2=CR^2-C\equiv C-$, $-C\equiv C-CR^2=CR^2-$, $-CR^2=CR^2-CH_2-O-OC-$, $-CO-O-CH_2-CR^2=CR^2-$, $-O-CO-C\equiv C-CO-O-$, $-O-CO-CR^2=CR^2-CO-O-$, $-O-CO-CH_2-CH_2-CO-O-$, $-S-CO-CR^2=CR^2-CO-S-$, $-CO-CH_2-NH-CO-$, $-CO-NH-CH_2-CO-$, $-NH-C(-CH_3)=CH-CO-$, $-CO-CH=C(-CH_3)-NH-$, $-CR^2=C(-Cl)-$, $-C(-Cl)=CR^2-$, $-CR^2=C(-CN)-$, $-C(-CN)=CR^2-$, $-N=C(-CN)-C(-CN)=N-$, $-CR^2=C(-CN)-CO-O-$, $-O-CO-C(-CN)=CR^2-$,

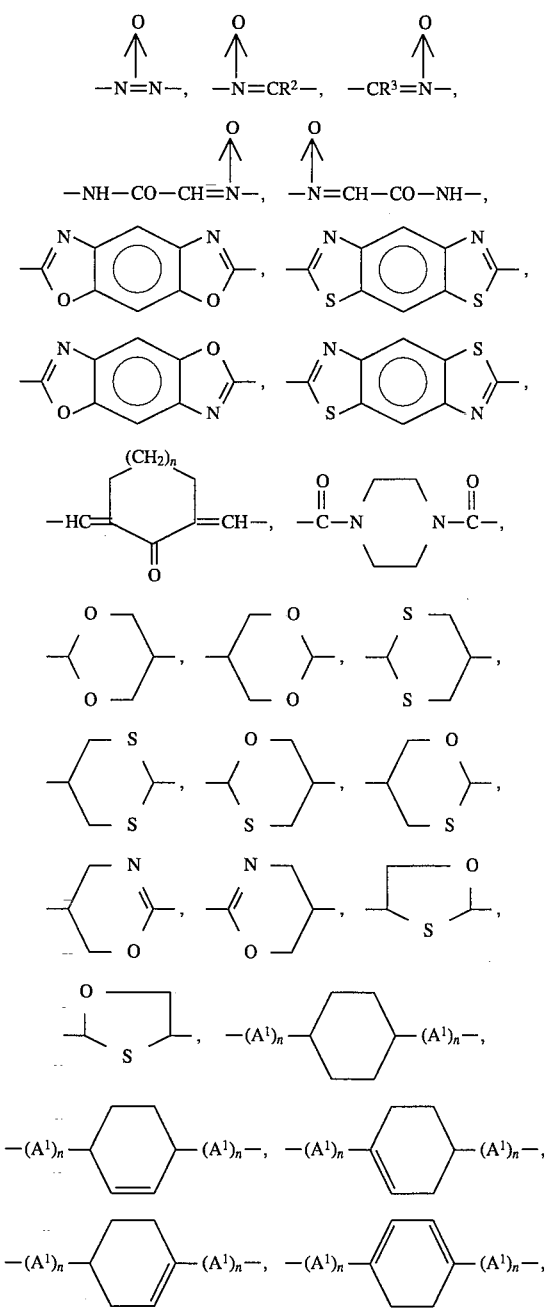

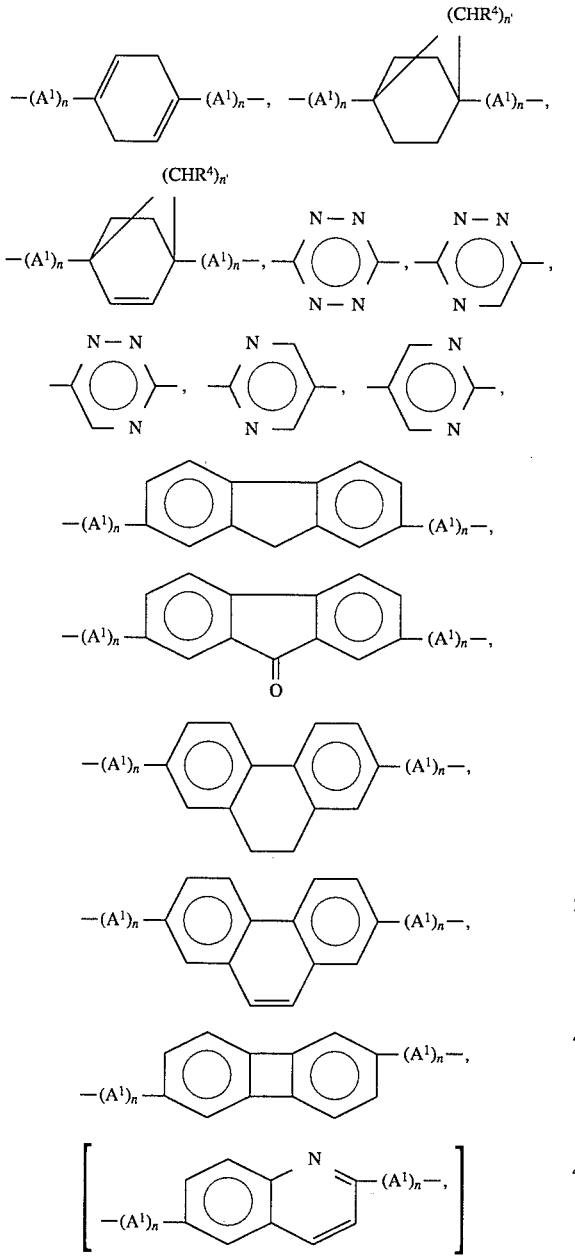
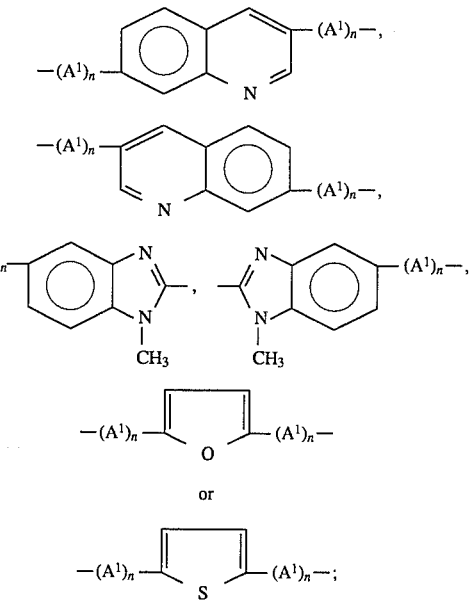

each $A^1$ is independently a —CO—, —O—CO—, —CO—O—, —CO—S—, —S—CO—, —CO—$NR^2$— or —$NR^2$—CO— group; each R is independently hydrogen or a hydrocarbyl or hydrocarbyloxy group having from one to about 10 carbon atoms, a halogen atom, a nitro group, a nitrile group or a —CO—$R^2$ group; each $R^1$ is independently hydrogen or a hydrocarbyl group having from one to about 10 carbon atoms, a halogen atom or a nitro group; each $R^2$ is independently hydrogen or a hydrocarbyl group having from one to about 6 carbon atoms; each $R^4$ is independently hydrogen or a hydrocarbyl group having from one to about 3 carbon atoms; n has a value of zero or 1; and n' has a value of 1 or 2.

2. An aromatic anhydride compound of claim 1 wherein A is —$CR^2$=$CR^2$—, one $R^2$ is hydrogen and the other $R^2$ is —$CH_3$.

* * * * *